(No Model.) 2 Sheets—Sheet 1.

E. & S. TWEEDALE & J. SMALLEY.
CARDING ENGINE.

No. 560,604. Patented May 19, 1896.

WITNESSES
Frederick A. Verity
Samuel Jackson

INVENTORS.
Edmund Tweedale
Samuel Tweedale
Joseph Smalley (No Model.) 2 Sheets—Sheet 2.

E. & S. TWEEDALE & J. SMALLEY.
CARDING ENGINE.

No. 560,604. Patented May 19, 1896.

WITNESSES.
Frederick N. Verity
Samuel Jackson

INVENTORS.
Edmund Tweedale
Samuel Tweedale
Joseph Smalley

UNITED STATES PATENT OFFICE.

EDMUND TWEEDALE, SAMUEL TWEEDALE, AND JOSEPH SMALLEY, OF CASTLETON, ENGLAND.

CARDING-ENGINE.

SPECIFICATION forming part of Letters Patent No. 560,604, dated May 19, 1896.

Application filed March 7, 1896. Serial No. 582,290. (No model.)

*To all whom it may concern:*

Be it known that we, EDMUND TWEEDALE, SAMUEL TWEEDALE, and JOSEPH SMALLEY, subjects of Her Majesty the Queen of Great Britain, residing at Castleton, in the county of Lancaster, England, have invented a certain new and useful Improvement in Carding-Engines, of which the following is a specification.

This invention relates to mechanism for driving the doffer of a carding-engine, whereby the doffer can be driven at the ordinary working speed or at a reduced speed or stopped entirely, thus facilitating "piecing up" and preventing waste.

Figure 1:
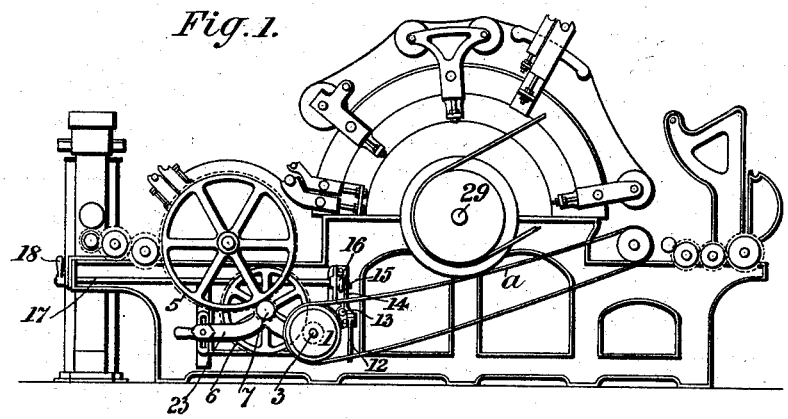
Figure 4:
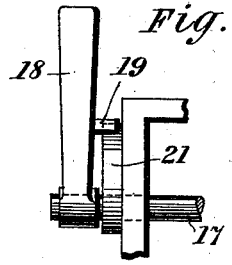
Figure 2:
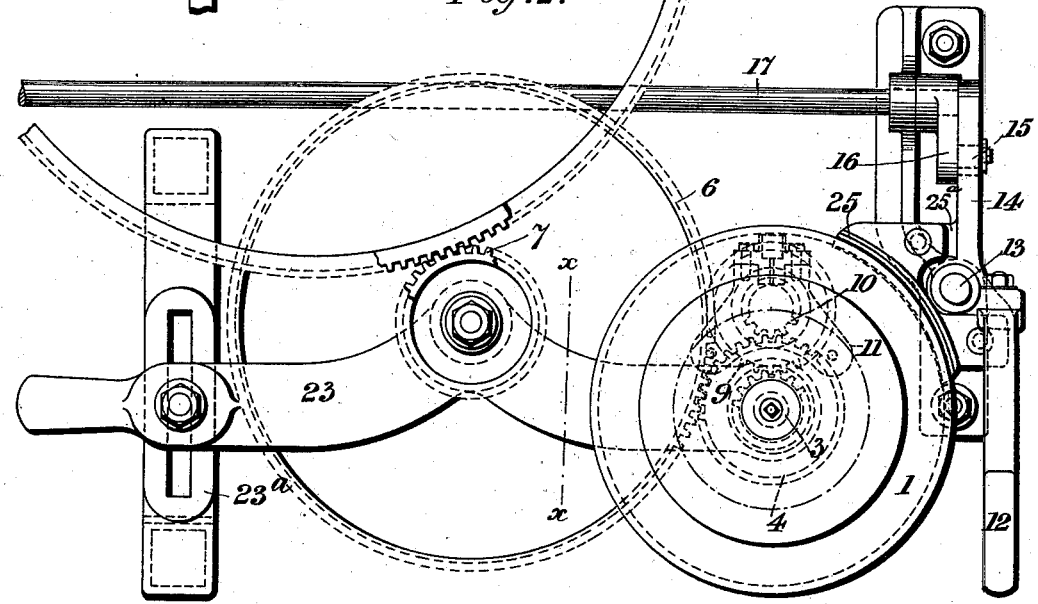
Figure 5:
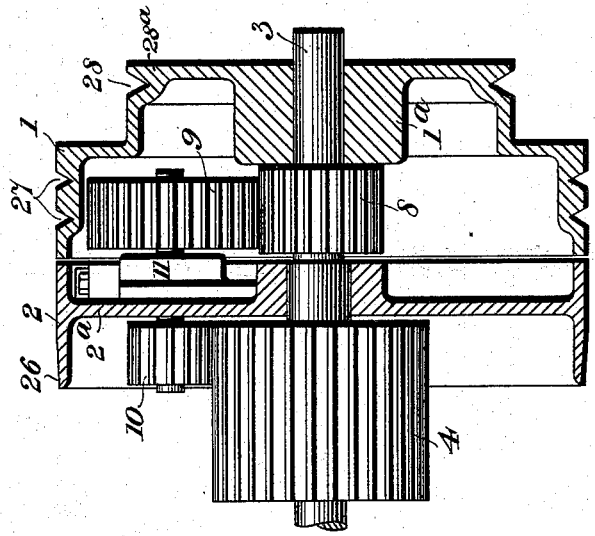
Figure 3:
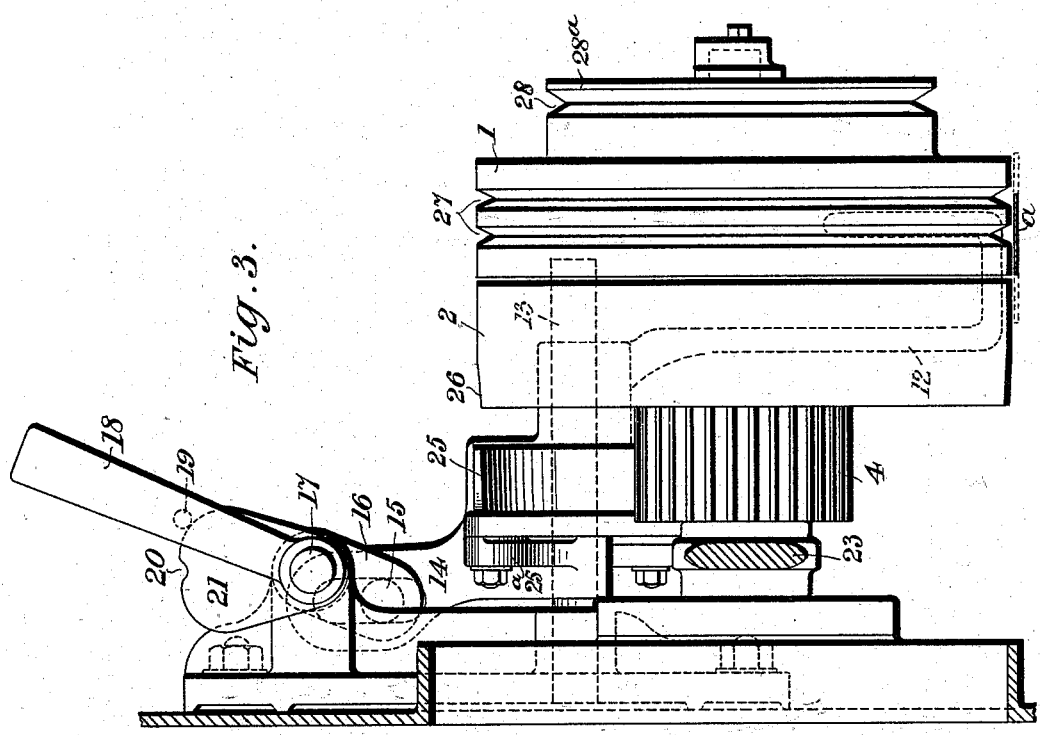

Referring to the accompanying drawings, Figure 1 is a side elevation of a carding-engine having our improvement applied thereto. Fig. 2 is a side elevation of the improved mechanism on an enlarged scale. Fig. 3 is an end elevation of Fig. 2, partly in section, on the line $x$ $x$ of Fig. 2, but on a larger scale. Fig. 4 is a side elevation of the belt-shifting handle. Fig. 5 is a sectional side elevation of the pulleys and gear connected therewith.

According to our invention we employ two belt-pulleys 1 2, both of which are loose on the shaft 3, carrying the spur-wheel 4 for driving the ordinary spur-wheel 5 of the doffer through the double carrier-wheels 6 7. The carrier-wheels are mounted on a lever 23, pivoted on the shaft 3 at one end and secured by a bolt and nut in the slot of an arm 23ª, so that the position of the carrier-wheels 6 7 can be adjusted. Fixed to the boss 1ª of the pulley 1 is a pinion 8, which gears into a carrier-wheel 9, which, with a second carrier-wheel 10, is carried in a bracket 11, secured to the plate part 2ª of the pulley 2. The carrier 9 gears into the wheel 8, which is secured to the pulley 1ª, as stated, and the carrier 10 gears with the wheel 4 for driving the doffer through the carrier-wheels 6 7 before referred to. The belt guide or fork 12 is mounted on the round shaft 13, so as to be free to be slid to and fro thereon, and the upper part 14 of the belt guide or fork 12 is connected to the crank 16, which is secured on the shaft 17 by means of a stud 15, carried by crank 16 and working in a slot in said arm 14. The shaft 17 is operated by a handle 18, Figs. 1, 3, and 4. A pin or stud 19 is fixed in the handle 18, and by moving the handle 18 so that when the pin rests in the notch 20 of the bracket 21 the belt guide or fork 12 can be held in its forward position. 25 is a leather-faced curved and beveled brake-shoe secured to a bracket 25ª, carried by the part 14 of the belt-guide 12. By means of this adjustment the driving-belt $a$ can readily be moved from the pulley 1, so as to be partially on both pulleys 1 and 2, and the speed of the doffer is regulated according as the driving-belt is in one or other of the positions, as hereinafter described.

The action is as follows: When the belt $a$ is partly on each of the pulleys 1 2 and in contact with and driving both, these act practically as one pulley and revolve together, and the double carrier-wheels 9 10 are also carried round, (but said wheels do not revolve round their own axes,) the teeth of the wheel 10 gearing into the wheel 4 and driving it and through it and the double carrier 6 7 the doffer. When the belt $a$ is moved onto the pulley 1, into the position shown in solid lines in Fig. 3, the pulley 1 only is driven, and the pulley 2 revolves in the opposite direction in consequence of the wheel 4, double carrier 6 7, and doffer offering a greater resistance than the pulley 2, and the doffer is stopped. When the belt $a$ is moved to the extreme outside edge of the pulley 1, the beveled and leather-covered brake 25 comes into contact with the beveled portion 26 of the pulley 2 and the latter is prevented from revolving, so that the pulley 1, by means of the pinion 8 and double carrier 9 10, drives the wheel 4, and a slow driving of the doffer is obtained, the speed of the doffer depending on the relative proportion of the teeth in the wheels 8, 9, 10, and 4.

For driving the grinding-rollers two grooves 27 27 are formed on the pulley 1 and the grinding-rollers are driven by ropes therefrom, the pulley 1 being then driven by a rope in a groove 28 (formed on a projection 28ª of pulley 1) from the loose pulley on the cylinder-shaft 29. The brake 25 is applied to the pulley 2, and the doffer is then driven at the slow speed, the cylinder being driven from the doffer by belt in the ordinary way.

What we claim is—

1. In a carding-engine, and in combination, a pair of pulleys, a shaft on which said pulleys are loose, a pinion secured to one of the pulleys, a spur-wheel loose on the shaft, a pair of carrier-wheels secured to the other pulley and off the center of same, one of said carrier-wheels engaging with the pinion and the other with the spur-wheel, the doffer, and means for driving same from the spur-wheel on the shaft, the belt, and means for shifting same, and a brake for holding one of the pulleys substantially as and for the purpose described.

2. In a carding-engine and in combination a pair of pulleys, a shaft on which said pulleys are loose, a pinion secured centrally to one of the pulleys, a spur-wheel loose on the shaft, a pair of carrier-wheels secured to the other pulley and off the center of same, one of said carrier-wheels engaging with the pinion and the other with the spur-wheel, the doffer, a spur-wheel for operating same, a second pair of carrier-wheels one engaging with the spur-wheel of the doffer and the other with the spur-wheel on the shaft, means for adjusting said carrier-wheels, the belt, a belt-shifter adapted to carry same across the faces of the pulleys, means for supporting the belt-shifter and a brake carried by said belt-shifter so that when the belt is at one end of one of the pulleys the other pulley will be held, substantially as and for the purpose set forth.

In testimony whereof we have hereunto set our hands in the presence of two subscribing witnesses.

EDMUND TWEEDALE.
SAMUEL TWEEDALE.
JOSEPH SMALLEY.

Witnesses:
FREDERICK A. VERITY,
SAMUEL JACKSON.